(12) United States Patent
Sato et al.

(10) Patent No.: US 9,278,312 B2
(45) Date of Patent: Mar. 8, 2016

(54) SYSTEM FOR RECOVERING HIGH-PURITY $CO_2$ FROM GASIFICATION GAS CONTAINING CO, $CO_2$, COS AND $H_2S$

(71) Applicant: MITSUBISHI HEAVY INDUSTRIES, LTD., Tokyo (JP)

(72) Inventors: Fumiaki Sato, Mihara (JP); Shinji Ogino, Mihara (JP); Motonari Aihara, Mihara (JP); Yudai Kato, Mihara (JP); Kazuo Ishida, Yokohama (JP); Seiji Kakesako, Hiroshima (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 30 days.

(21) Appl. No.: 14/019,951

(22) Filed: Sep. 6, 2013

(65) Prior Publication Data

US 2014/0010747 A1 Jan. 9, 2014

Related U.S. Application Data

(62) Division of application No. 12/604,060, filed on Oct. 22, 2009, now Pat. No. 8,551,416.

(30) Foreign Application Priority Data

Apr. 30, 2009 (JP) .................................. 2009-110597

(51) Int. Cl.
*B01D 53/62* (2006.01)
*B01D 53/75* (2006.01)
(Continued)

(52) U.S. Cl.
CPC ................ *B01D 53/62* (2013.01); *B01D 53/75* (2013.01); *C01B 3/16* (2013.01); *C01B 3/50* (2013.01);
(Continued)

(58) Field of Classification Search
CPC .......... B01D 53/62; B01D 53/75; C01B 3/16; C01B 3/50; C01B 3/52; C10K 1/00; C10K 1/004; C10K 1/005; C10K 3/04
USPC .......... 423/220, 230, 242.1, 244.01, 247, 655, 423/656; 252/373
See application file for complete search history.

(56) References Cited

U.S. PATENT DOCUMENTS

| 3,001,373 A | 9/1961 | Du Bois Eastman et al. |
| 4,052,176 A | 10/1977 | Child et al. |

(Continued)

FOREIGN PATENT DOCUMENTS

| JP | 2006-522004 A | 9/2006 |
| WO | 2008-103467 A1 | 8/2008 |
| WO | 2009-019497 A2 | 2/2009 |

OTHER PUBLICATIONS

European Search Report dated Aug. 23, 2010, issued in corresponding European Patent Application No. 09175874.
(Continued)

*Primary Examiner* — Jill Warden
*Assistant Examiner* — Joye L Woodard
(74) *Attorney, Agent, or Firm* — Westerman, Hattori, Daniels & Adrian, LLP

(57) ABSTRACT

A method and system for recovering $CO_2$ from gasification gas, prevents the recovered $CO_2$ from being contaminated with COS, without repeating cooling and heating operations and without increasing the steam consumption. Gasification gas being produced in a gasifier 10 and containing CO, $CO_2$, COS and $H_2S$ is subjected to dust removal in a scrubber 20. Then, a part of the gas is subjected to a CO shift reaction, in which CO is converted into $CO_2$, in a CO shift reactor 30. Another part of the gasification gas is not subjected to the CO shift reaction by means of a bypass 34, and is mixed with the gas after the CO shift reaction. Thereby, the temperature of the mixture gas is set at 180° C. to 300° C., and COS in the mixture gas is converted into $H_2S$ in a COS converter 40.

7 Claims, 6 Drawing Sheets

(51) Int. Cl.
- *C01B 3/16* (2006.01)
- *C01B 3/50* (2006.01)
- *C01B 3/52* (2006.01)
- *C10K 1/00* (2006.01)
- *C10K 3/04* (2006.01)
- *B01D 53/77* (2006.01)
- *B01D 53/86* (2006.01)
- *C10K 1/08* (2006.01)

(52) U.S. Cl.
CPC ... *C01B 3/52* (2013.01); *C10K 1/00* (2013.01); *C10K 1/004* (2013.01); *C10K 1/005* (2013.01); *C10K 3/04* (2013.01); *B01D 53/77* (2013.01); *B01D 53/86* (2013.01); *B01D 2257/304* (2013.01); *B01D 2257/308* (2013.01); *B01D 2257/502* (2013.01); *B01D 2257/504* (2013.01); *C01B 2203/0283* (2013.01); *C01B 2203/0415* (2013.01); *C01B 2203/0455* (2013.01); *C01B 2203/0465* (2013.01); *C01B 2203/0475* (2013.01); *C01B 2203/0485* (2013.01); *C01B 2203/84* (2013.01); *C10J 2300/093* (2013.01); *C10J 2300/165* (2013.01); *C10K 1/08* (2013.01); *Y02C 10/06* (2013.01)

(56) References Cited

U.S. PATENT DOCUMENTS

| | | | |
|---|---|---|---|
| 4,254,094 | A | 3/1981 | Hegarty |
| 4,511,668 | A * | 4/1985 | Nozue et al. ............ 502/84 |
| 4,536,382 | A | 8/1985 | Blytas |
| 4,540,681 | A | 9/1985 | Kustes et al. |
| 4,891,187 | A | 1/1990 | Jungfer et al. |
| 4,981,661 | A * | 1/1991 | Borsboom et al. ......... 423/230 |
| 7,935,324 | B2 | 5/2011 | Serban et al. |
| 2002/0121093 | A1 | 9/2002 | Wallace et al. |
| 2006/0096298 | A1 | 5/2006 | Barnicki et al. |
| 2008/0098654 | A1 | 5/2008 | Cherry et al. |
| 2010/0018216 | A1 | 1/2010 | Fassbender |

OTHER PUBLICATIONS

Chinese Notice of Allowance dated Jan. 15, 2013 issued in corresponding Chinese patent application No. 200910222026.X, w/ English translation.

Notice of Allowance dated May 8, 2013, issued in corresponding Canadian Patent Application No. 2,683,007 (1 page).

Canadian Notice of Allowance dated Jul. 2, 2013 corresponding to Canadian Patent Application No. 2813775, Divisional of Canadian Patent Application No. 2683007.

Notice of Acceptance dated Apr. 2, 2015, issued in corresponding Australian application No. 2009230786 (3 pages).

* cited by examiner

SYSTEM FOR RECOVERING HIGH-PURITY $CO_2$ FROM GASIFICATION GAS CONTAINING CO, $CO_2$, COS AND $H_2S$

CROSS-REFERENCE TO RELATED APPLICATIONS

This application is a Divisional of U.S. patent application Ser. No. 12/604,060 filed Oct. 22, 2009, which is based upon and claims the benefit of priority from prior Japanese Patent Application No. 2009-110597, filed on Apr. 30, 2009, the entire contents of which are incorporated herein by reference.

BACKGROUND OF THE INVENTION

The present invention relates to a method and to a system for recovering carbon dioxide from raw gas obtained by gasifying fossil fuels such as coal and petroleum, i.e., from gasification gas.

Combined cycle power generation has been implemented in which gasification gas is combusted to drive a gas turbine, and also in which steam is generated from the combustion exhaust gas to drive a steam turbine. The combustion exhaust gas, which is released to the atmosphere, contains carbon dioxide. From the viewpoint of global environmental protection, performing carbon dioxide capture and storage (CCS) is highly desired.

In this connection, as shown in FIG. 5, the following has been proposed in Japanese Patent Application Publication No. 2006-522004. Specifically, raw gas produced in a gasifier 110 is subjected to dust removal by a scrubber 120. Then, CO contained in the raw gas is reacted with steam 3 in a CO shift reactor 130 to perform a shift reaction, which produces $CO_2$ and $H_2$ ($CO+H_2O\rightarrow CO_2+H_2$). $H_2S$ and $CO_2$ contained in this CO shifted gas are then removed one after another by a physical absorption process called the Selexol process, or more specifically, by a $H_2S$ absorption apparatus 140 and a $CO_2$ recovery apparatus 150. Then the CO shifted gas is supplied to a gas turbine.

SUMMARY OF THE INVENTION

As seen from the above formula of the shift reaction, the CO shift reactor 130 requires steam ($H_2O$) 3 in an amount at least equimolar to CO. Shortage of the water causes coking, in which carbon (C) derived from CO is deposited. To prevent this coking and to thereby achieve longer life of a CO shift catalyst, the steam 3 needs to be supplied in an amount exceeding the theoretical amount. However, a large amount of steam consumption causes a problem of decrease in net thermal efficiency.

The conversion ratio in the CO shift reactor 130 reaches generally 90% or more. When the $CO_2$ recovery of the whole system is high, e.g., 90%, the entire amount of raw gas may be introduced into the CO shift reactor 130. In contrast, when the $CO_2$ recovery is desired to be lowered to, for example, 60%, it is favorable in terms of net thermal efficiency that the conversion ratio of the CO shift reaction be lowered so that CO, the lower heating value (LHV) of which is higher than that of $H_2$, may remain unreacted. However, it is difficult to control the conversion ratio in the CO shift reactor 130.

In this connection, as shown in FIG. 6, it can be thought that a part of raw gas 1 from the gasifier 110 is sent to the CO shift reactor 130a through a main supply path 121, whereas the remainder of the raw gas 1 bypasses the CO shift reactor 130a through a bypass 134. This means that CO in the gas passing through the bypass 134 is not recovered by the $CO_2$ recovery apparatus 150 located downstream. Accordingly, a desired $CO_2$ recovery can be achieved, and the CO concentration in the gas can be increased. In addition, since the amount of the steam 3 consumed in the CO shift reactor 130 depends on the amount of CO in the main supply path 121, the amount of the steam consumption can be reduced by an amount that would be otherwise consumed by the gas flowing through the bypass 134.

However, the raw gas 1 contains carbonyl sulfide (COS). When the entire amount of the raw gas 1 is introduced into the CO shift reactor 130, the COS is reacted with the steam 3 in the CO shift reactor 130 to thereby produce $CO_2$ and $H_2S$, which can be removed by the $H_2S$ absorption apparatus 140 located downstream. In contrast, when the bypass 134 is provided as shown in FIG. 6, COS contained in the raw gas flowing through the bypass 134 flows into the apparatuses located downstream, and eventually contaminates $CO_2$ recovered by the $CO_2$ recovery apparatus 150. Storage of such $CO_2$ contaminated with COS poses a safety problem. Moreover, such $CO_2$ contaminated with COS cannot be used for food and chemical applications.

In this connection, in order to remove COS, it can be thought to modify the $H_2S$ absorption apparatus 140 for the Selexol process, so that two stages of $H_2S$ absorption towers 140a and 140b are provided, and a COS converter 143 is additionally provided therebetween, as shown in FIG. 7. CO shifted gas 9 containing COS is introduced, through piping 132, into the first $H_2S$ absorption tower 140a, where the $H_2S$ is removed. Then, the gas is introduced into the COS converter 143 through piping 141. The gas after converting the COS into $H_2S$ is introduced, through piping 144, into the second $H_2S$ absorption tower 140b, where the $H_2S$ converted from COS is removed. Then, the gas is sent to a $CO_2$ recovery apparatus as purified gas.

An absorption liquid having absorbed $H_2S$ is introduced from the $H_2S$ absorption tower 140b into the $H_2S$ absorption tower 140a through piping 147. In the $H_2S$ absorption tower 140a, the absorption liquid further absorbs $H_2S$, and is introduced, through piping 146, into a concentrating tower 145, where gas containing $H_2$, CO, $CO_2$ and the like dissolved in the absorption liquid is released by flash. This gas is returned to the first $H_2S$ absorption tower 140a through piping 148 and a compressor 149. The absorption liquid concentrated by the flash is introduced into a stripping tower 162 through piping 161. In the stripping tower 162, acidic gas of $H_2S$ is released from the absorption liquid by heating with a reboiler 169, and is exhausted through piping 163 at the tower top and a condenser 164. A condensed liquid obtained in the condenser 164 is returned to the stripping tower 162 through piping 165, a tank 166 and a pump 167. On the other hand, the absorption liquid regenerated by the striping of the acidic gas is discharged from piping 168, and heats the absorption liquid in the piping 146 at a heat exchanger 171. Furthermore, the regenerated absorption liquid is cooled by a cooler 173, is supplied to the absorption tower 140a, and is reused.

The $H_2S$ absorption in the $H_2S$ absorption towers 140a and 140b is performed in a low temperature range of, for example, 8° C. to 20° C. In contrast, the COS conversion reaction performed in the COS converter 143 located between the $H_2S$ absorption towers 140a and 140b is usually performed at 150° C. to 350° C. This requires that the gas be cooled in the first $H_2S$ absorption tower 140a, be heated upstream of the COS converter 143, and further be cooled upstream of the second $H_2S$ absorption tower 142b. Performing such operations for raising and lowering the temperature causes a problem of deterioration in thermal efficiency. Also, since water in the shifted gas is absorbed in the first $H_2S$ absorption tower 140a, additional steam 4 needs to be supplied as water for the COS conversion reaction. When the amount of the steam consumption increases, there arises a problem of decrease in net thermal efficiency as described above.

In view of the above problems, an object of the present invention is to provide a method and a system for recovering high-purity $CO_2$ from gasification gas. Specifically, even when the $CO_2$ recovery ratio is changed in recovering $CO_2$ from gasification gas, the method and the system are capable of preventing the recovered $CO_2$ from being contaminated with COS, without repeating cooling and heating operations and without increasing the steam consumption.

To achieve the above object, one aspect of the present invention provides a method for recovering $CO_2$ from gasification gas containing CO, $CO_2$, COS and $H_2S$, the method including: a CO shift reaction step of subjecting a part of the gasification gas to conversion of CO in the part of the gasification gas into $CO_2$; a COS conversion step of mixing a different part of the gasification gas with the resulting part of the gasification gas after the CO shift reaction without subjecting the different part of the gasification gas to the CO shift reaction step, so that a temperature of the mixture gas is set at 150° C. to 350° C. to thereby convert COS in the mixture gas into $H_2S$; a $H_2S$ absorption step of absorbing and removing $H_2S$ from the resulting mixture gas after the COS conversion; and a $CO_2$ absorption step of absorbing and removing $CO_2$ from the resulting mixture gas from which $H_2S$ has been removed in the $H_2S$ absorption step.

According to another aspect of the present invention, a method for recovering $CO_2$ from gasification gas containing CO, $CO_2$, COS and $H_2S$ includes: a CO shift reaction step of subjecting a part of the gasification gas to conversion of CO in the part of the gasification gas into $CO_2$; a COS conversion step of performing heat exchange between a different part of the gasification gas and the resulting part of the gasification gas after the CO shift reaction without subjecting the different part of the gasification gas to the CO shift reaction step, so that a gas temperature of the different part of the gasification gas is set at 150° C. to 350° C. to thereby convert COS in this another part of the gasification gas into $H_2S$; a $H_2S$ absorption step of mixing the resulting another part of the gasification gas after the COS conversion with the resulting part of the gasification gas after the CO shift reaction, and absorbing and removing $H_2S$ from the mixture gas; and a $CO_2$ absorption step of absorbing and removing $CO_2$ from the resulting mixture gas from which $H_2S$ has been removed in the $H_2S$ absorption step.

Also, still another aspect of the present invention provides a system for recovering $CO_2$ from gasification gas containing CO, $CO_2$, COS and $H_2S$, the system including: a CO shift reactor for subjecting a part of the gasification gas to conversion of CO in the part of gasification gas into $CO_2$; a bypass through which a different part of the gasification gas bypasses the CO shift reactor and thereby not to be introduced thereinto; a COS converter for converting COS in a mixture gas into $H_2S$, the mixture gas comprising the gas having passed through the CO shift reactor and the gas having passed through the bypass; a $H_2S$ absorption apparatus for absorbing and removing $H_2S$ from the resulting mixture gas having passed through the COS converter; and a $CO_2$ absorption apparatus for absorbing and removing $CO_2$ from the resulting mixture gas from which $H_2S$ has been removed by the $H_2S$ absorption apparatus.

According to yet another aspect of the present invention, a system for recovering $CO_2$ from gasification gas containing CO, $CO_2$, COS and $H_2S$ includes: a CO shift reactor for subjecting a part of the gasification gas to conversion of CO in the part of the gasification gas into $CO_2$; a bypass through which a different part of the gasification gas bypasses the CO shift reactor and thereby not to be introduced thereinto; a COS converter for converting COS in the gas having passed through the bypass into $H_2S$; a $H_2S$ absorption apparatus for absorbing and removing $H_2S$ from a mixture gas of the gas having passed through the CO shift reactor and the gas having passed through the COS converter; and a $CO_2$ absorption apparatus for absorbing and removing $CO_2$ from the resulting mixture gas from which $H_2S$ has been removed by the $H_2S$ absorption apparatus.

As described above, according to the present invention, a bypass is provided, and CO in gasification gas through the bypass is not subjected to the shift reaction. A mixture gas of gas having passed through the bypass and CO shifted gas is subjected to the COS conversion reaction. Alternatively, only gas having passed through the bypass is subjected to the COS conversion reaction. Then, $H_2S$ converted from the COS is removed by a $H_2S$ absorption apparatus located downstream. Accordingly, even when the $CO_2$ recovery ratio is changed in recovering $CO_2$ from gasification gas, it is possible to prevent the recovered $CO_2$ from being contaminated with COS, without repeating cooling and heating operations and without increasing the steam consumption.

DESCRIPTION OF THE PREFERRED EMBODIMENTS

Figure 1:
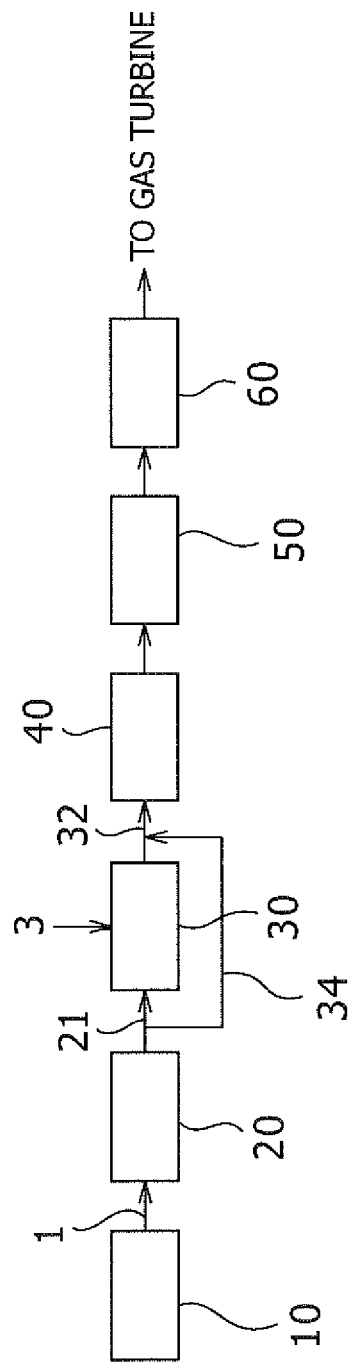
FIG. 1 is a block diagram showing one embodiment of a $CO_2$ recovery system according to the present invention.

Hereinbelow, description will be given of one embodiment of a system and a method for recovering $CO_2$ from gasification gas, according to the present invention, with reference to the accompanying drawings. As shown in FIG. 1, the $CO_2$ recovery system of this embodiment is mainly composed of: a scrubber 20 for subjecting gas 1 obtained by gasifying coal in a gasifier 10 (abbreviated as "raw gas") to dust removal; a CO shift reactor 30 for subjecting a part of the raw gas 1 to conversion of CO in the raw gas 1 into $CO_2$; a COS converter 40 for converting COS in a mixture gas into $H_2S$, the mixture gas being a mixture of CO shifted gas having passed through the CO shift reactor 30 and the remainder of the raw gas 1 having passed through a bypass 34; a $H_2S$ absorption apparatus 50 for absorbing $H_2S$ in gas after the COS conversion while passing through the COS converter 40; and a $CO_2$ recovery apparatus 60 for absorbing $CO_2$ from purified gas obtained by removing $H_2S$ in the $H_2S$ absorption apparatus 50.

As the gasifier 10, a gasifier which is generally used in gasifying coal can be used. The raw gas 1 obtained by gasifying coal contains hydrogen ($H_2$), carbon monoxide (CO) and carbon dioxide ($CO_2$), as the main components. In addition, the raw gas 1 contains carbonyl sulfide (COS), hydrogen sulfide ($H_2S$), and the like. A filter (not shown) for removing dust having a relatively large diameter contained in the raw gas 1 may be disposed downstream of the gasifier 10.

As the scrubber 20, a wet scrubber which absorbs and removes relatively fine dust and halogens in the raw gas 1 by supplying an absorption liquid into contact with the raw gas 1 can be used. Examples of such a scrubber include a spray tower, a packed tower, a cyclone scrubber, a jet scrubber, a rotary washer, a venturi scrubber, and the like. When certain types of scrubber 20 are employed, hazardous substances such as mercury, ammonia, heavy metals, and halogens can be absorbed and removed, in addition to the dust removal.

A main supply path 21 is provided as an outlet path of the scrubber 20. Through the main supply path 21, a part of the raw gas 1 from which the dust has been removed is supplied to the CO shift reactor 30. The bypass 34 is also provided as another outlet path of the scrubber 20. Through the bypass 34, the remainder of the raw gas 1 from which dust has been removed is supplied to the COS converter 40, while bypassing the CO shift reactor 30, i.e., not supplied to the CO shift reactor 30.

The CO shift reactor 30 is an apparatus in which CO in the raw gas 1 is reacted with $H_2O$ to perform a shift reaction to produce $H_2$ and $CO_2$ ($CO+H_2O \rightarrow CO_2+H_2$). Since the raw gas 1 contains $H_2S$, a sulfur-resistant shift reaction catalyst such as a Co/Mo-based catalyst is preferably used in the CO shift reactor 30.

Figure 2:
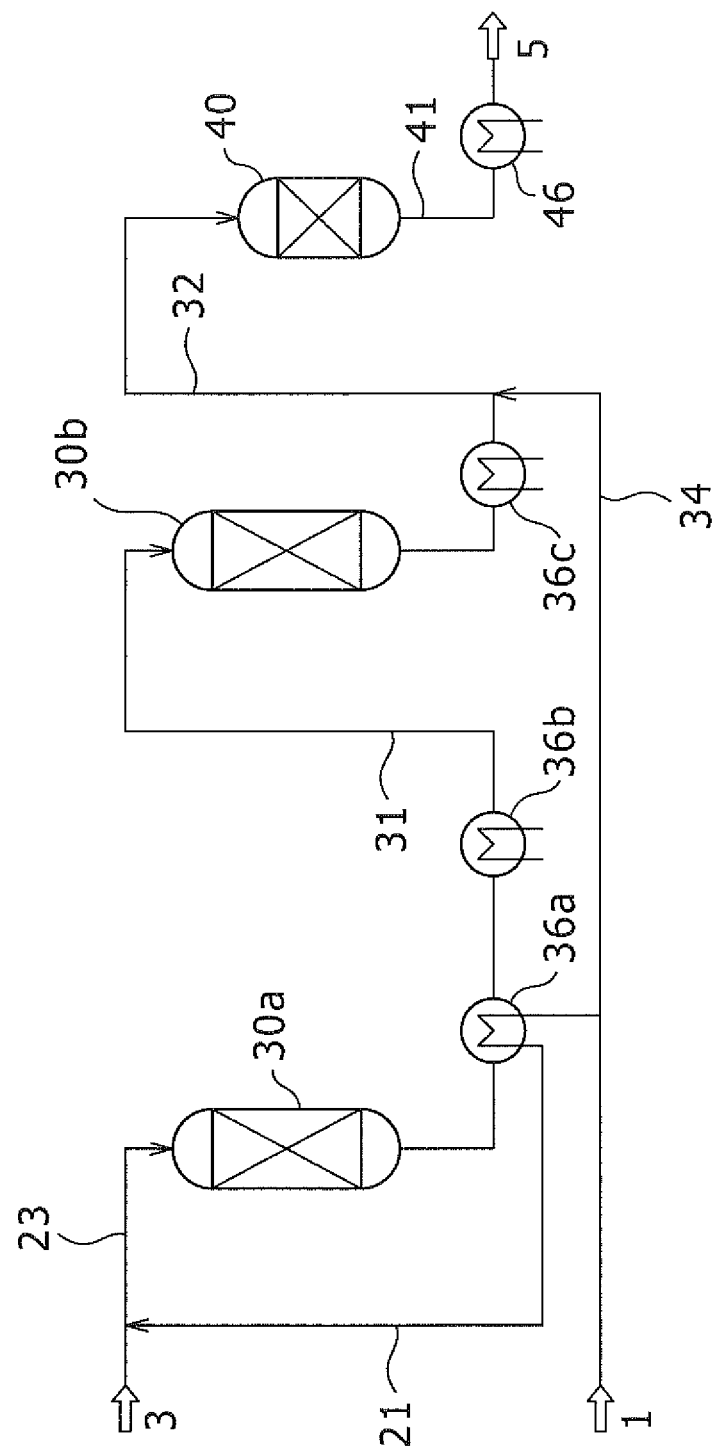
FIG. 2 is a schematic diagram showing the configuration of a CO shift reactor and a COS converter in FIG. 1.

Also, in the CO shift reactor 30, multiple CO shift reactors such as a first CO shift reactor 30a and a second CO shift reactor 30b can be arranged in series, as shown in FIG. 2. Such provision of multiple staged CO shift reactors makes it possible to reduce the amount of steam supplied to the shift reactors, and to increase CO conversion ratio. In addition, a heat exchanger 36 can be provided in each piping 31 or piping 32. The piping 31 is provided between the stages of the CO shift reactors 30a and 30b so as to supply the CO shifted gas. Through the piping 32, the CO shifted gas is supplied from the CO shift reactor 30b located at the final stage to the COS converter 40. For example, a configuration can be employed in which the raw gas 1 in the piping 21 is preheated by a heat exchanger 36a provided between the first and second CO shift reactors 30a and 30b. The COS converter 40 is an apparatus in which COS in gas is reacted with $H_2O$ to perform the COS conversion reaction which produces $H_2S$ and $CO_2$ ($COS+H_2O \rightarrow H_2S+CO_2$). The COS converter 40 is filled with a catalyst which promotes the conversion of COS. Examples of such a COS conversion catalyst preferably used include barium-based, chromium-based, and potassium-based catalysts, and the like. Piping 41 for supplying gas 5 after the COS conversion reaction to the $H_2S$ absorption apparatus 50 is provided after the COS converter 40. Also, a heat exchanger 46 is provided in the piping 41.

Figure 3:
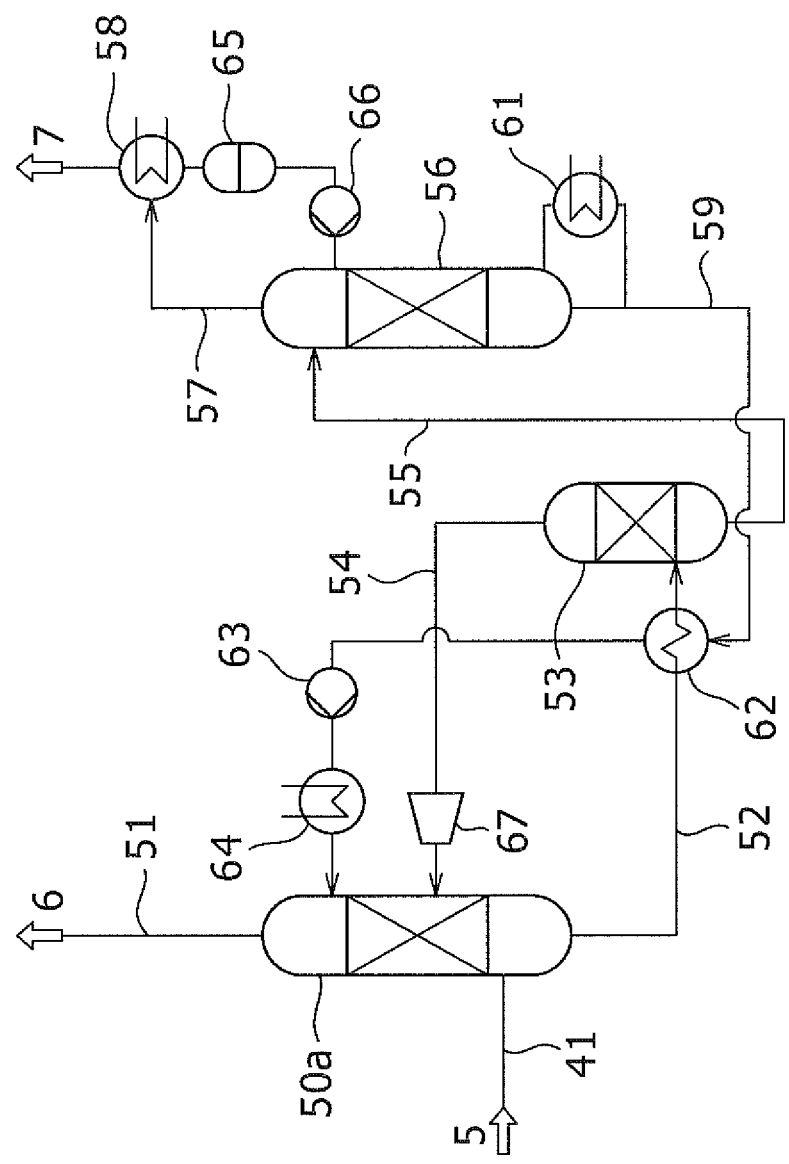
FIG. 3 is a schematic diagram showing the configuration of a $H_2S$ absorption apparatus in FIG. 1.

The $H_2S$ absorption apparatus 50 is an apparatus which removes $H_2S$ by a physical absorption process. In the $H_2S$ absorption apparatus 50, it is preferable to employ the Selexol process, for example. The $H_2S$ absorption apparatus 50 will be described in detail with reference to FIG. 3. As shown in FIG. 3, the $H_2S$ absorption apparatus 50 is mainly composed of: an absorption tower 50a for absorbing and removing $H_2S$ in the gas 5 after the COS conversion reaction, by mainly using an absorption liquid; a concentrating tower 53 for concentrating $H_2S$ concentration in the absorption liquid, by flash; and a stripping tower 56 for stripping $H_2S$ from the concentrated absorption liquid.

For example, in a case of the Selexol process, as the absorption liquid used in the absorption tower 50a, a dimethyl ether solution of polyethylene glycol is preferably used. Piping 51 is provided at the top of the absorption tower 50a. Through the piping 51, purified gas 6 obtained by the removal of $H_2S$ is supplied to the $CO_2$ recovery apparatus 60. Also, piping 52 is provided at the bottom of the absorption tower 50a. Through the piping 52, the absorption liquid having absorbed $H_2S$ is supplied to the concentrating tower 53.

Piping 54 is provided at the top of the concentrating tower 53. Through the piping 54, gas containing $H_2$, CO, and $CO_2$ produced by the flashing of the absorption liquid is sent to the absorption tower 50a. This piping 54 is provided with a compressor 67 for compressing the flashed gas. Also, piping 55 is provided at the bottom of the concentrating tower 53. Through the piping 55, the concentrated absorption liquid is supplied to the stripping tower 56.

Piping 57 is provided at the top of the stripping tower 56. Through the piping 57, acidic gas 7 of $H_2S$ stripped from the absorption liquid is exhausted. The piping 57 is provided with a condenser 58 for cooling the acidic gas 7. The condenser 58 is provided with a tank 65 for temporarily storing the condensed liquid of the acidic gas 7. Also, the tank 65 is provided with a pump 66 for returning the condensed water to the stripping tower 56. A reboiler 61 and piping 59 are provided at the bottom of the stripping tower 56. The reboiler 61 heats the absorption liquid. Through the piping 59, the absorption liquid regenerated by the stripping is sent to the absorption tower 50a. The piping 59 is provided with a heat exchanger 62, a pump 63 and a cooler 64. The heat exchanger 62 performs heat exchange between the piping 59 and the piping 52 which sends the absorption liquid from the absorption tower 50a to the concentrating tower 53. The pump 63 sends the regenerated absorption liquid under pressure, and the cooler 64 cools the regenerated absorption liquid.

The $CO_2$ recovery apparatus 60 is an apparatus which removes $CO_2$ in the purified gas 6 by a physical absorption process. For example, the Selexol process is preferably employed in the $CO_2$ recovery apparatus 60, as in the case of the $H_2S$ absorption apparatus 50. In the case of the Selexol process, a dimethyl ether solution of polyethylene glycol can be used as the absorption liquid used in the $CO_2$ recovery apparatus 60, as in the case of the $H_2S$ absorption apparatus 50.

As shown in FIG. 1, with the above configuration, the raw gas 1 obtained by gasifying coal in the gasifier 10 is first introduced into the scrubber 20. A part of the raw gas 1 subjected to the dust removal by the absorption liquid in the scrubber 20 is supplied, through the main supply path 21, to the CO shift reactor 30, or, in a case of the multistage configuration, to the first CO shift reactor 30a as shown in FIG. 2. The remainder of the raw gas 1 subjected to the dust removal is supplied to the COS converter 40 through the bypass 34. Although depending on the gasifier 10 and the scrubber 20, the temperature of the raw gas 1 exhausted from the scrubber 20 is, for example, in the range of 100° C. to 150° C.

A preferable ratio between the flow amount of the raw gas 1 into the main supply path 21 and the flow amount of the raw gas 1 into the bypass 34 varies depending on the settings of the recovery ratio of carbon recovered as $CO_2$ in the $CO_2$ recovery apparatus (also referred to as "carbon recovery ratio"), the recovery ratio being represented with the carbon content in the raw gas 1 being taken as 100 and the temperature of the mixture gas supplied to the COS converter 40. However, when the $CO_2$ recovery ratio is 50 to 80%, 45 to 15% of the raw gas 1 is preferably sent to the bypass 34. A more preferable ratio of the raw gas 1 sent to the bypass 34 is 30%, when $CO_2$ recovery ratio is 65%.

In the CO shift reactor 30, CO contained in the one part of the raw gas 1 is converted into $CO_2$ by the CO shift reaction. The CO shift reaction requires steam ($H_2O$) in an amount at least equimolar to CO, as shown in the formula described above. For this reason, steam 3 is supplied to the CO shift reactor 30. Note that an insufficient amount of steam in the CO shift reaction causes coking, in which carbon (C) derived from CO is deposited ($2CO \rightarrow C+CO_2$). To prevent this coking, the steam 3 is preferably supplied in an amount greater than the theoretical amount. For example, the amount of the steam 3 supplied is preferably such that the molar ratio $H_2O$/CO is in the range of 1.5 to 5.0, and more preferably such that the molar ratio is in the range of 1.7 to 2.4.

The CO shift reaction is an exothermic reaction. In a case in which the CO shift reactor 30 has a multistage configuration, the temperature of the CO shifted gas exhausted from the second CO shift reactor 30b at the final stage is, for example, in the range of 250° C. to 450° C., although this varies depending on the conditions of the raw gas 1 and the like. In the CO shift reactor 30, along with the above-described CO shift reaction, a reaction also takes place in which COS in the raw gas 1 reacts with $H_2O$ to produce $CO_2$ and $H_2S$ ($COS+H_2O \rightarrow CO_2+H_2S$). In other words, COS had been removed from the CO shifted gas having passed through the CO shift reactor 30.

As shown in FIG. 2, the CO shifted gas is mixed with the remainder of the raw gas which is not subjected to the CO shift reaction owing to the bypass 34. Then, the mixture gas passes through the piping 32, and is introduced into the COS converter 40. At this time, the CO shifted gas has a temperature ranging from 250° C. to 450° C., and the remainder of the raw gas from the bypass 34 has a temperate ranging from 100° C. to 150° C. Accordingly, the temperature of this mixture gas can be in the range of 150° C. to 350° C., which is temperature necessary for the COS conversion reaction. Note that the temperature of this mixture gas can be controlled by adjusting the temperature of the CO shifted gas by the heat exchanger 36c provided in the piping 32 between the CO shift reactor 30 and the bypass 34. A more preferable temperature of the mixture gas is 180° C. to 300° C., and a further preferable temperature is 180° C. to 250° C. In this way, in the course of gradually cooling the CO shifted gas, the temperature range necessary for the COS conversion reaction can be achieved. Accordingly, no temperature operation involving repetition of cooling and heating operations is performed, thereby improving the thermal efficiency.

The COS conversion reaction requires steam ($H_2O$) in an amount at least equimolar to COS, as shown in the formula described above. The raw gas 1 out of the mixed gases is humidified in the scrubber 20 and therefore has a sufficient amount of $H_2O$ necessary for the reaction. Meanwhile, the CO shifted gas is supplied with a large amount of the steam 3 for the CO shift reaction. Accordingly, without particularly supplying additional steam, $H_2O$ is very rich in the COS converter 40. This is favorable in terms of the reaction equilibrium, and thereby a high COS conversion ratio can be achieved.

The gas 5 exhausted from the COS converter 40 after the COS conversion reaction is cooled by the heat exchanger 46 until the gas temperature reaches a temperature ranging from 40° C. to 60° C., for example. Then, the cooled gas is sent to the $H_2S$ absorption apparatus 50 through the piping 41. In the flow shown in FIG. 2, the heat exchanger 36c can produce high pressure steam since the gas temperature after the CO shift is high. The heat exchanger 46 can also produce low pressure steam.

In the $H_2S$ absorption apparatus 50, the gas 5 after the COS conversion is introduced into the absorption tower 50a, where $H_2S$ in the gas is absorbed and removed by gas-liquid contact with the absorption liquid, as shown in FIG. 3. The purified gas 6 obtained by the removal of $H_2S$ is sent, through the piping 51 at the tower top, to the $CO_2$ recovery apparatus 60. On the other hand, the absorption liquid having absorbed $H_2S$ is discharged through the piping 52 at the bottom of the absorption tower 50a. The discharged absorption liquid is heated in the heat exchanger 62 by the regenerated absorption liquid from the stripping tower 56, and then introduced into the concentrating tower 53.

In the concentrating tower 53, the absorption liquid is flashed to thereby release gas containing $H_2$, CO, $CO_2$ and the like dissolved in the absorption liquid. This gas is returned to the absorption tower 54 through the piping 54. The absorption liquid concentrated by the flash is introduced into the stripping tower 56 through the piping 55.

In the stripping tower 56, the acidic gas 7 of $H_2S$ is released from the absorption liquid by heating with the reboiler 61. The acidic gas 7 is exhausted from the piping 57 at the tower top, condensed in the condenser 58, and it is then sent to a sulfur recovery facility (not shown). In the condenser 58, water vapor or the like accompanying the acidic gas 7 is condensed and removed. The condensed liquid accumulates in the tank 65 and is returned to the stripping tower 56 by the pump 66. On the other hand, a part of the absorption liquid regenerated by the striping of the acidic gas is heated by the reboiler 61 at the bottom of the stripping tower 56. Another part of the regenerated absorption liquid is discharged from the piping 59, and heats the absorption liquid having absorbed $H_2S$ in the piping 52 at the heat exchanger 62. Then, the regenerated absorption liquid is cooled by the cooler 64, then is supplied to the absorption tower 50a, and is reused.

The purified gas 6 obtained by the removal of $H_2S$ in the $H_2S$ absorption apparatus 50 is introduced into the $CO_2$ recovery apparatus 60, where $CO_2$ is removed and recovered from the purified gas by gas-liquid contact with the absorption liquid. The gas obtained by the removal and recovery of $H_2S$ is supplied to a gas turbine as a composite fuel for power generation. Alternatively, the gas can be used as a raw material for chemical synthesis, or the like. The carbon in the $CO_2$ recovered by the $CO_2$ recovery apparatus 60 includes the carbon from CO converted into $CO_2$ in the CO shift reactor 30, the carbon from COS converted into $CO_2$ in the COS converter 40, and, of course, the carbon from $CO_2$ contained in the raw gas 1 from the beginning. Meanwhile, the carbon in the $CO_2$ recovered by the $CO_2$ recovery apparatus 60 does not include the carbon from CO contained in the remainder of the raw gas bypassing the CO shift reactor 30 through the bypass 34.

Accordingly, the $CO_2$ recovery can be controlled by the ratio of the flow amount through the bypass 34 relative to the entire flow amount of the raw gas 1. For example, in a case in which the flow amount through the bypass 34 of 0% achieves a $CO_2$ recovery of about 90%, the $CO_2$ recovery can be set to 50 to 80% by setting the ratio of the flow amount through the bypass 34 to 45 to 15%. In this way, by lowering the $CO_2$ recovery, CO concentration in the gas used in a combustor of a gas turbine is increased, and combustion heat is also increased. Thereby power generation efficiency can be improved.

Figure 4:
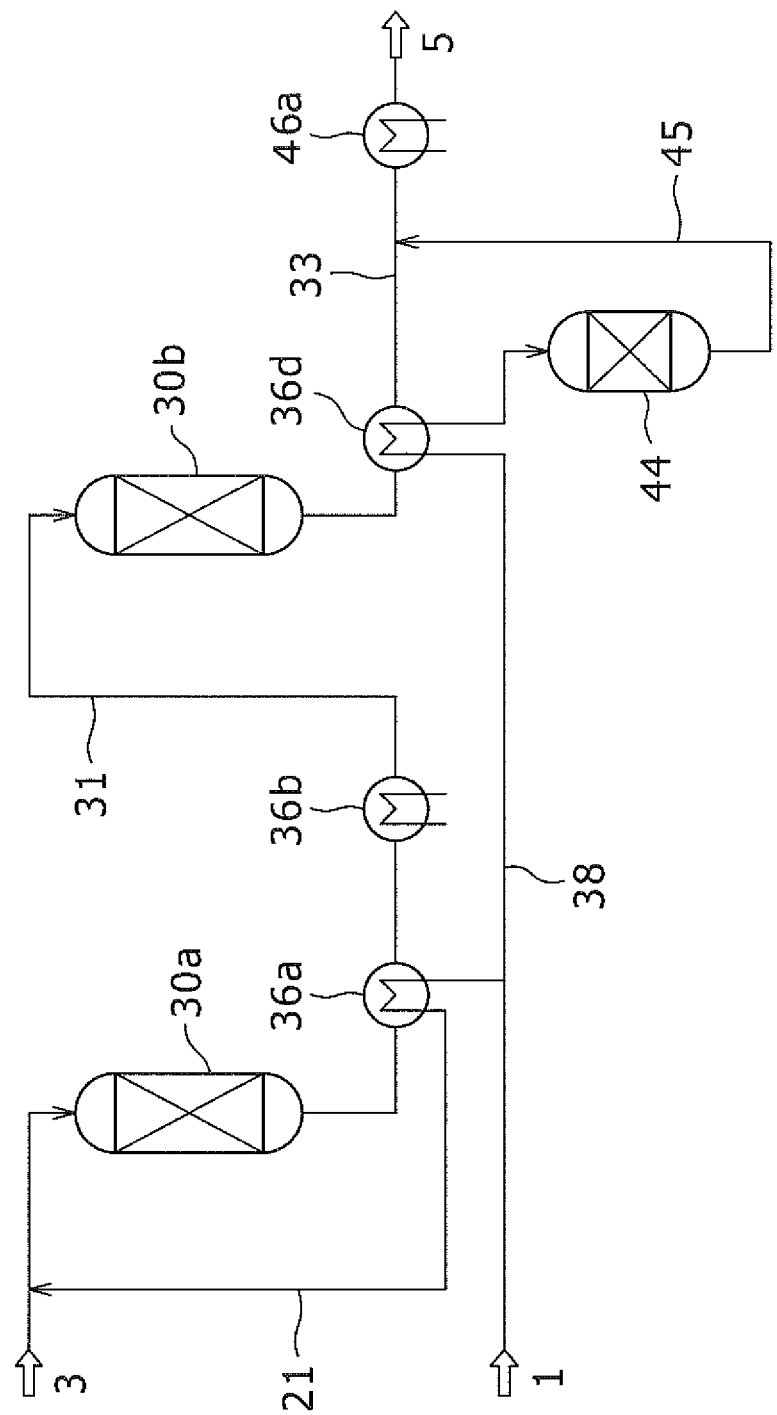
FIG. 4 is a schematic diagram of another embodiment of a $CO_2$ recovery system according to the present invention, showing another configuration of the CO shift reactor and the COS converter.
Figure 5:
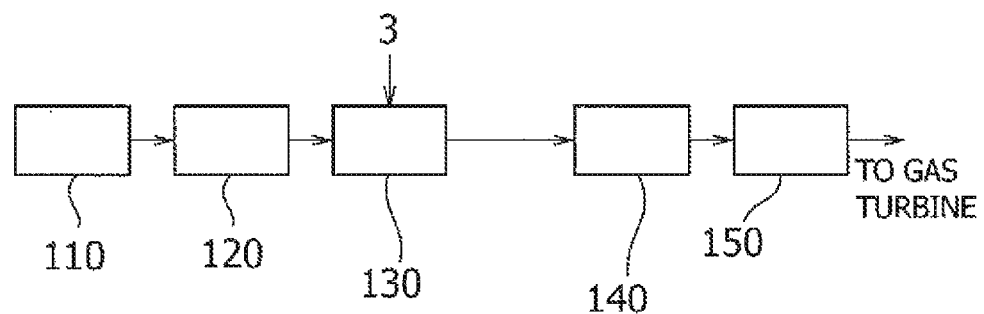
FIG. 5 is a block diagram showing one example of a conventional $CO_2$ recovery system.
Figure 6:
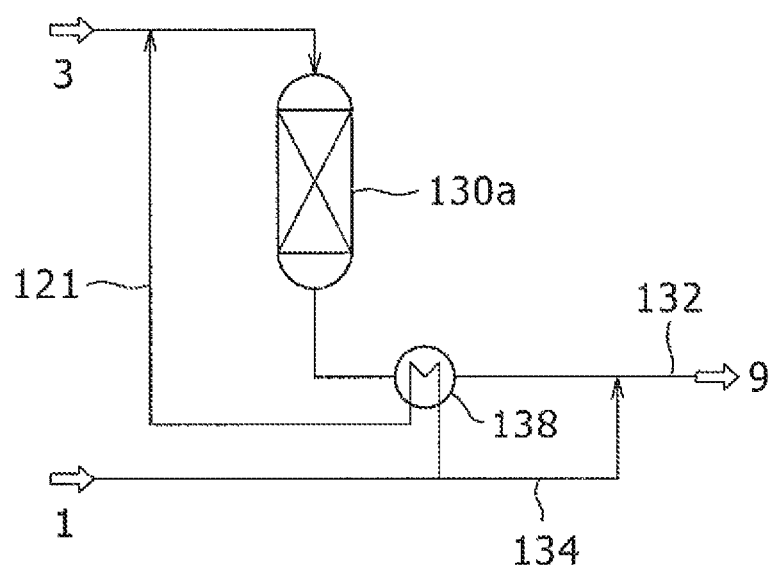
FIG. 6 is a schematic diagram showing the configuration of a CO shift reactor of related art.
Figure 7:
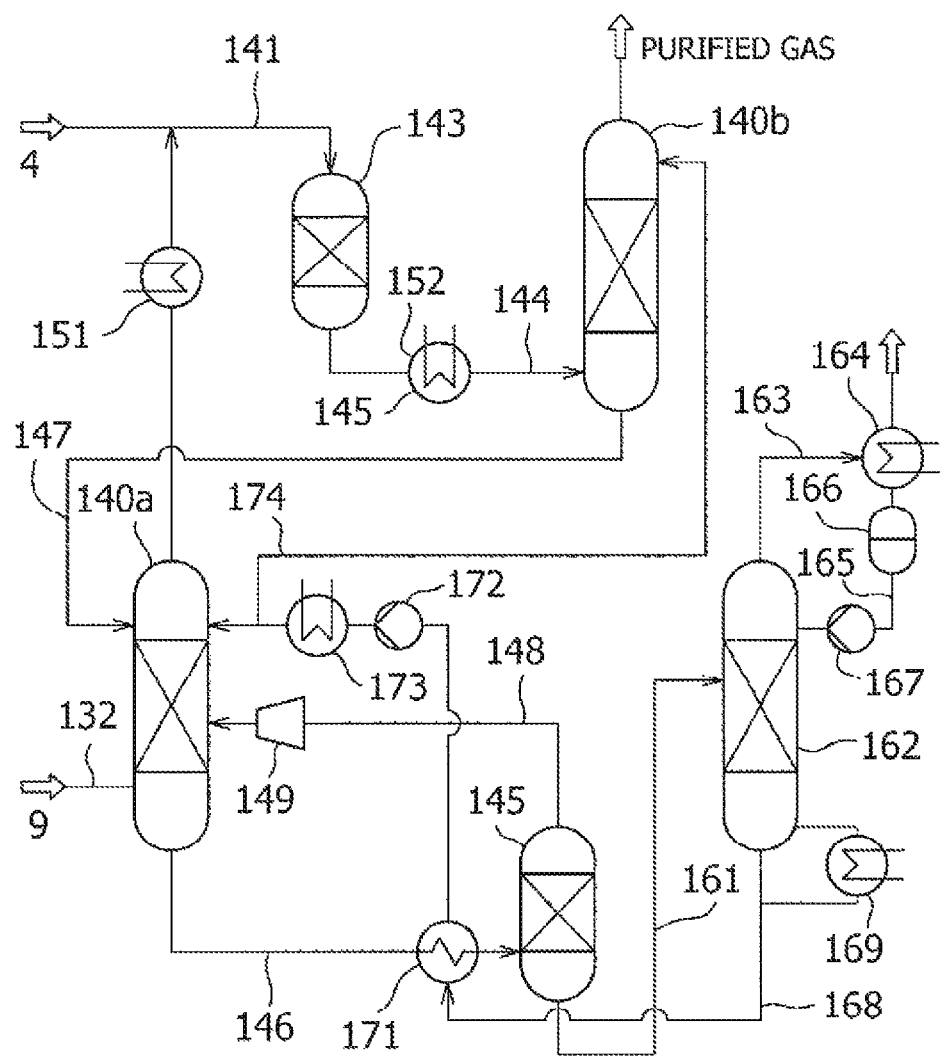
FIG. 7 is a schematic diagram showing the configuration of a two-stage $H_2S$ absorption apparatus of related art.

Note that in the embodiment shown in FIG. 1 and FIG. 2, the bypass 34 is connected to the piping 32 through which the CO shifted gas is supplied from the CO shift reactor 30 to the COS converter 40; however, the present invention is not limited thereto. For example, as shown in FIG. 4, a bypass 38 may be directly connected to a COS converter 44, and piping 45 for supplying gas after the COS conversion from the COS converter 44 to the $H_2S$ absorption apparatus 50 may be connected to piping 33 for supplying CO shifted gas from the CO shift reactor 30 to the $H_2S$ absorption apparatus 50. In this case, a heat exchanger 36d is provided to perform heat exchange between the piping 33 for the CO shifted gas and the bypass 38.

With such a configuration, since the raw gas 1 is humidified by the scrubber 20, no additional steam supply is needed in the COS converter 44. Moreover, in the embodiment shown in FIG. 4, only the bypass 38 is provided with the COS converter 44. Accordingly, the COS converter 44 can be made smaller than that in the embodiment shown in FIG. 1 and FIG. 2. The heat exchanger 46a can produce higher pressure steam than the heat exchanger 46 shown in FIG. 2. On the other hand, the heat exchanger 36c in FIG. 2 produces high pressure steam, whereas the heat exchanger 36d in FIG. 4 produces no steam.

What is claimed is:

1. A method for recovering $CO_2$ from gasification gas containing CO, $CO_2$, COS and $H_2S$ and generating power by using a fuel gas resulting from the gasification gas, the method comprising:
    a CO shift reaction step comprising subjecting a first amount of the gasification gas to conversion of CO in the first amount of the gasification gas into $CO_2$;
    a COS conversion step comprising mixing a second amount of the gasification gas with the resulting first amount of the gasification gas after the CO shift reaction without subjecting the second amount of the gasification gas to the CO shift reaction step, and converting COS in the mixture gas into $H_2S$, the mixture gas subjected to the COS conversion having a temperature in a range of 150° C. to 350° C.;
    a $H_2S$ absorption step comprising absorbing and removing $H_2S$ from the resulting mixture gas after the COS conversion; and
    a $CO_2$ absorption step comprising absorbing and removing $CO_2$ from the resulting mixture gas from which $H_2S$ has been removed in the $H_2S$ absorption step; and
    a power generation step of generating power by using the fuel gas which is obtained by removing $CO_2$ from the resulting mixture gas in the $CO_2$ absorption step.

2. The method of claim 1, further comprising a dividing gas step comprising dividing the gasification gas into the first amount and the second amount so that lowering the $CO_2$ recovery and improving power generation efficiency are controlled by the second amount of the gasification gas.

3. The method of claim 1, further comprising a heat exchange step comprising adjusting a temperature of the resulting first amount of the gasification gas after the CO shift reaction before the resulting first amount of the gasification gas is mixed with the second amount of the gasification gas.

4. The method of claim 2, wherein a ratio of the second amount of the gasification gas to the first amount of the gasification gas is in a range of 45 to 15%, and a $CO_2$ recovery ratio in the method is in a range of 50 to 80%.

5. A method for recovering $CO_2$ from gasification gas containing CO, $CO_2$, COS and $H_2S$, comprising:
    a CO shift reaction step comprising subjecting a first amount of the gasification gas to conversion of CO in the first amount of the gasification gas into $CO_2$;
    a COS conversion step comprising performing heat exchange between a second amount of the gasification gas and the resulting first amount of the gasification gas after the CO shift reaction without subjecting the second amount of the gasification gas to the CO shift reaction step, and converting COS in the second amount of the gasification gas into $H_2S$, the second amount of the gasification gas subjected to the COS conversion having a gas temperature in a range of 150° C. to 350° C.;
    a $H_2S$ absorption step comprising mixing the resulting second amount of gasification gas after the COS conversion with the resulting first amount of the gasification gas after the CO shift reaction and absorbing and removing $H_2S$ from the mixture gas; and
    a $CO_2$ absorption step comprising absorbing and removing $CO_2$ from the resulting mixture gas from which $H_2S$ has been removed in the $H_2S$ absorption step.

6. The method of claim 5, wherein the $CO_2$ absorption step comprises obtaining fuel gas for power generation by removing $CO_2$ from the resulting mixture gas, and the method further comprises a dividing gas step comprising dividing the gasification gas into the first amount and the second amount so that lowering the $CO_2$ recovery and improving power generation efficiency are controlled by the second amount of the gasification gas.

7. The method of claim 6, wherein a ratio of the second amount of the gasification gas to the first amount of the gasification gas is in a range of 45 to 15%, and a $CO_2$ recovery ratio in the method is in a range of 50 to 80%.

* * * * *